United States Patent
Fujimura (10) Patent No.: US 8,848,348 B2
(45) Date of Patent: Sep. 30, 2014

(54) ELECTRONIC DEVICE AND METHOD FOR ATTACHING ACTUATION BUTTON

(75) Inventor: Nobuhiko Fujimura, Tokyo (JP)

(73) Assignee: Almedio Inc., Tokyo (JP)

( * ) Notice: Subject to any disclaimer, the term of this patent is extended or adjusted under 35 U.S.C. 154(b) by 484 days.

(21) Appl. No.: 13/070,234

(22) Filed: Mar. 23, 2011

(65) Prior Publication Data

US 2012/0162867 A1   Jun. 28, 2012

(30) Foreign Application Priority Data

Dec. 27, 2010 (JP) ................................ 2010-289596

(51) Int. Cl.
*H05K 7/00* (2006.01)
*G06F 1/16* (2006.01)

(52) U.S. Cl.
CPC ............ *G06F 1/1684* (2013.01); *G06F 1/1632* (2013.01); *G06F 1/1656* (2013.01)
USPC ...................................... 361/679.01; 200/520

(58) Field of Classification Search
CPC .... G06F 1/1632; G06F 1/1601; G06F 1/1679
USPC ............. 361/679.02, 679.55–679.58, 679.21, 361/679.22, 679.27, 679.26, 679.08, 361/679.09; 200/520
See application file for complete search history.

(56) References Cited

U.S. PATENT DOCUMENTS

| | | | | |
|---|---|---|---|---|
| 3,389,526 A | * | 6/1968 | Meyer | 52/718.05 |
| 6,084,192 A | | 7/2000 | Honma | |
| 6,667,447 B2 | * | 12/2003 | Liu et al. | 200/5 R |
| 2010/0254102 A1 | * | 10/2010 | Furubo | 361/752 |

FOREIGN PATENT DOCUMENTS

| | | |
|---|---|---|
| JP | 55-63027 A | 4/1980 |
| JP | 60-126923 A | 8/1985 |
| JP | 61-55506 A | 4/1986 |
| JP | 6180914 A | 6/1994 |
| JP | 8116186 A | 5/1996 |
| JP | 11-163555 A | 6/1999 |
| JP | 2006164748 A | 6/2006 |
| JP | 2008152844 A | 7/2008 |

OTHER PUBLICATIONS

Office Action mailed Apr. 22, 2014, for Japanese Patent Application No. 2010-289596 (4 pgs.)

* cited by examiner

*Primary Examiner* — Anthony Haughton
*Assistant Examiner* — Ingrid Wright
(74) *Attorney, Agent, or Firm* — Seed IP Law Group PLLC (57) ABSTRACT

An electronic device has a design panel 12 made of a resin and an actuation button to be attached to the design panel 12. The actuation button includes a button portion for accepting user's operation and arms 22 connected to the button portion. The design panel 12 has an insert hole 40 into which a main body 24 of the button portion is to be inserted and projecting members 44. The projecting members are engaged with portions of the respective arms 22 on a back surface of the design panel 12 while the arms 22 are allowed to move in a plane direction of the design panel, thereby preventing drop of the arms 22 from the design panel 12.

5 Claims, 12 Drawing Sheets

ELECTRONIC DEVICE AND METHOD FOR ATTACHING ACTUATION BUTTON

PRIORITY INFORMATION

This application claims priority to Japanese Patent Application No. 2010-289596, filed on Dec. 27, 2010, which is incorporated herein by reference in its entirety.

TECHNICAL FIELD

The present invention relates to an electronic device equipped with a design panel to which an actuation button is to be attached as well as to a method for attaching an actuation button to the design panel.

BACKGROUND ART

An electronic device, like an optical disc drive, usually has a design panel that acts as an exterior surface of the electronic device. An actuation button for accepting user's operation is attached to the design panel. The actuation button is attached to the design panel during a manufacturing process, and various techniques have hitherto been put forward in connection with a method for attaching the actuation button.

For instance, JP 6-180914 A describes a technique for attaching arms joined to an eject button to a design panel with screws. Further, JP 8-116186 A describes a technique for forming mount holes in leading ends of arms joined to a button and letting pins standing upright on a design panel pass through the mount holes, thereby attaching the button to the design panel. Disclosed in JP 2006-164748 A is a technique for forming a rectangular-frame-shaped fit-on frame on a leading end of a hinge joined to an actuation button, letting an indented portion standing upright on a design panel pass through the fit-on frame, and holding the actuation button between the design panel and a holder member. Further, JP 2008-152844 A describes a technique for forming an attachment hole in a leading end of each of arms joined to an eject button, inserting the mount holes to weld bosses formed on a design panel, and melting the weld bosses by means of a solder iron, or the like, to thus attach the eject button to the design panel.

However, the related art techniques involve the following drawbacks. The technique described in connection with JP 6-180914 A is directed toward a configuration for attaching an actuation button by means of screw engagement and hence can be said to be laborious. In the meantime, the techniques described in connection with JP 8-116186 A and JP 2006-164748 A involve merely inserting a boss on a design panel into a hole in a button, and hence attachment operation can be performed relatively easily. However, under the technique described in connection with JP 8-116186 A, mere the boss is inserted to the hole, and hence there is a potential risk of detachment of the button. Under the technique described in connection with JP 2006-164748 A, the boss is inserted into the hole, and the button is sandwiched between the design panel and the holder member. Hence, there is no potential risk of detachment of the button. However, the technique described in connection with JP 2006-164748 A involves a necessity for a new component called a holder member for preventing detachment of the button, which raises a problem of an increase in the number of components and, by extension, a problem of a cost increase. Under the technique described in connection with JP 2008-152844 A for attaching a button to a design panel by means of welding, occurrence of a problem of an increase in the number of components and a problem of detachment of a button is prevented. However, the technique described in connection with JP 2008-152844A entails a welding facility in order to attach a button to a design panel, which is apt to make mounting operation extensive. Another problem is that a once-attached button cannot be detached from the design panel. Specifically, an electric device that enables easy attachment of an actuation button to a design panel while preventing detachment of the actuation button and a button attachment method have hitherto been unavailable.

SUMMARY

Accordingly, the present invention aims at providing an electric device that enables easy attachment of an actuation button to a design panel while preventing detachment of the actuation button as well as providing a button attachment method.

The present invention provides an electronic device comprising: a design panel made of a resin; and an actuation button that is to be attached to the design panel and that has a button portion to accept user's operation while remaining, at least in part, exposed outside and arms connected to the button portion, wherein the design panel includes an insert hole into which the button portion is to be inserted and engagement members that are engaged with portions of the respective arms on the back surface of the design panel in a state of the arms being allowed to move in a plane direction of the design panel, thereby preventing drop of the arms from the design panel.

In a preferred mode, each of the arms has a slit extending in a longitudinal direction of the arm; and the engagement members are projecting members that project from a back surface of the design panel, that are inserted into corresponding slits, and that each have at its leading end a turned portion which is larger than the corresponding slit in terms of a width. In this case, it is more preferable that each of the arms should further include a passage hole that is connected to each of the slits and that has a width larger than a width of the corresponding turned portion.

In another preferred mode, the engagement members are bridge members that protrude from a back surface of the design panel, and a space is made between each of the bridge members and the back surface; and wherein the arms are slid and inserted into the space, to thus engage with the corresponding bridge members.

Another invention provides a button attachment method for attaching to a design panel of an electronic device an actuation button having a button portion for accepting user's operation and arms connected to the button portion, the method comprising: inserting the button portion into an insert hole formed in the design panel made of a resin; causing portions of the respective arms to engage with engagement members provided on a back surface of the design panel while the arms are allowed to move in a plane direction of the design panel, thereby preventing drop of the arms from the design panel.

According to the present invention, only the portions of the respective arms are engaged with the corresponding engagement members. Therefore, the actuation button is easily attached to the design panel while detachment of the actuation button is prevented.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail by reference to the following drawings, wherein.

DESCRIPTION OF EMBODIMENTS

Figure 1:
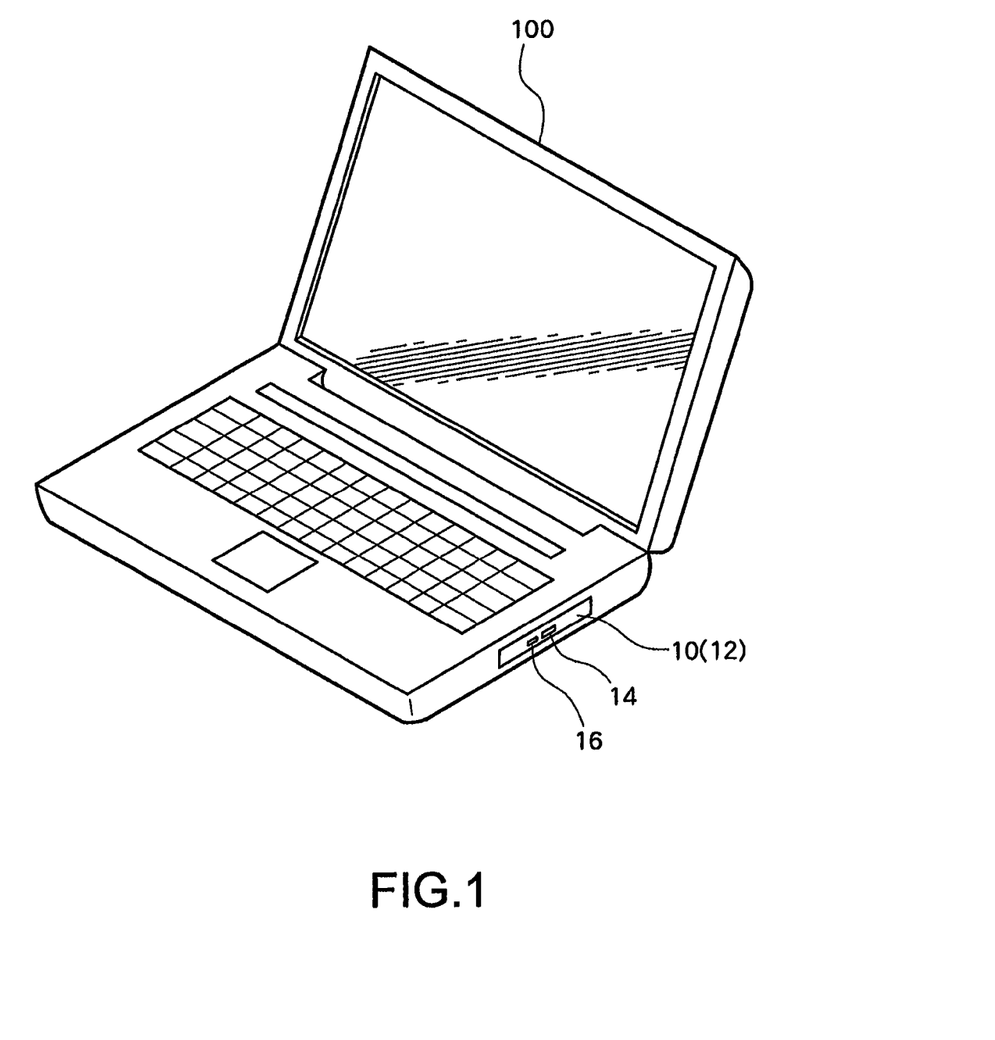
FIG. 1 is an oblique perspective view of a PC equipped with an optical disc drive that is an embodiment of the present invention.

Embodiments of the present invention are hereunder described by reference to the drawings. FIG. 1 is a schematic perspective view of a personal computer (hereinafter abbreviated as a "PC") 100 with a built-in optical disc drive 10 that is an embodiment of the present invention. In a state of being incorporated in the PC 100, the optical disc drive 10, for the most part, is housed in the PC 100. Only a design panel 12 situated on the front of the optical disc drive 10 is exposed outside. The design panel 12 is equipped with an actuation button 14 that accepts an operating instruction from a user, a light guide lens 16 that is a constituent element of an indicator, and others.

An insert hole into which a button portion of the actuation button 14 is to be inserted is formed in the design panel 12. Arms joined to the button portion are attached to a back surface of the design panel 12, whereby the actuation button 14 is attached to the design panel 12. In the present embodiment, in order to easily attach the actuation button 14 to the design panel 12 without involvement of detachment of the button, a special configuration is given to the design panel 12 and the actuation button 14. The special configuration is hereunder described in detail.

Figure 2:
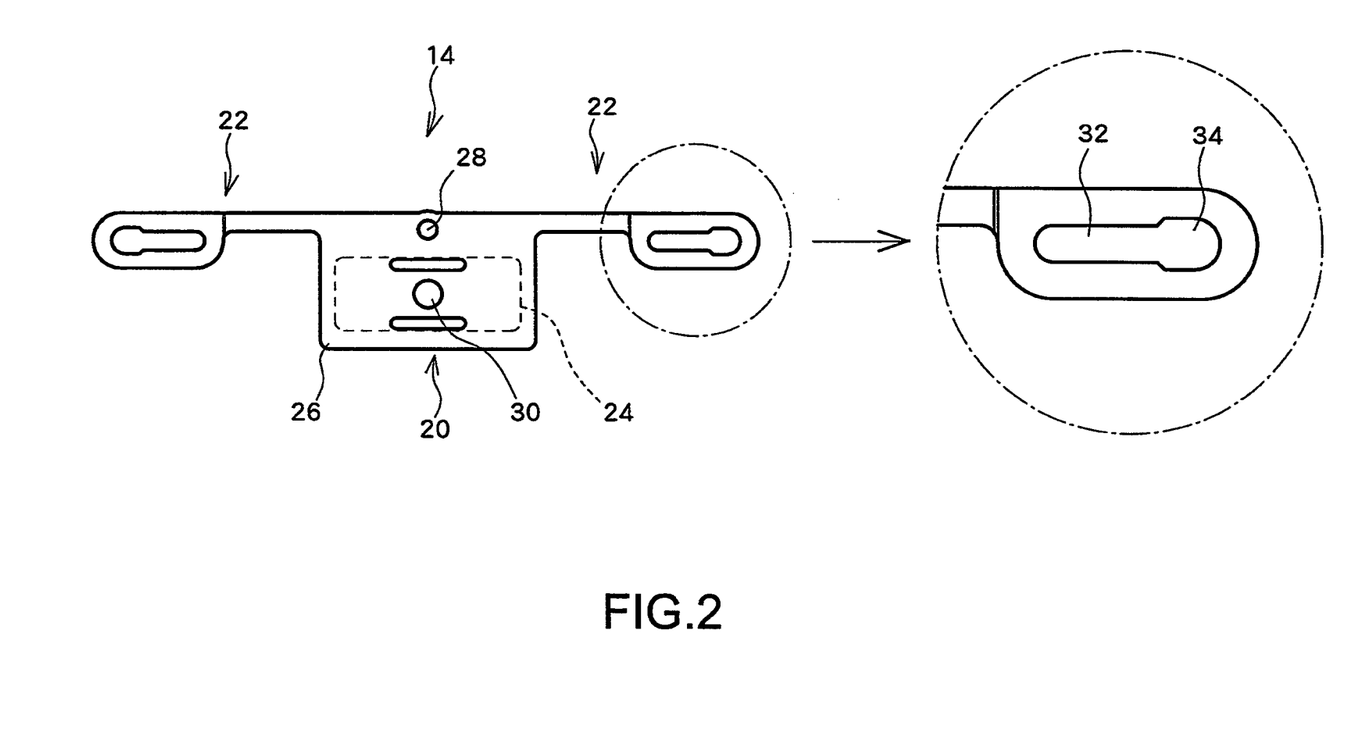
FIG. 2 is a rear view of an actuation button.
Figure 3:
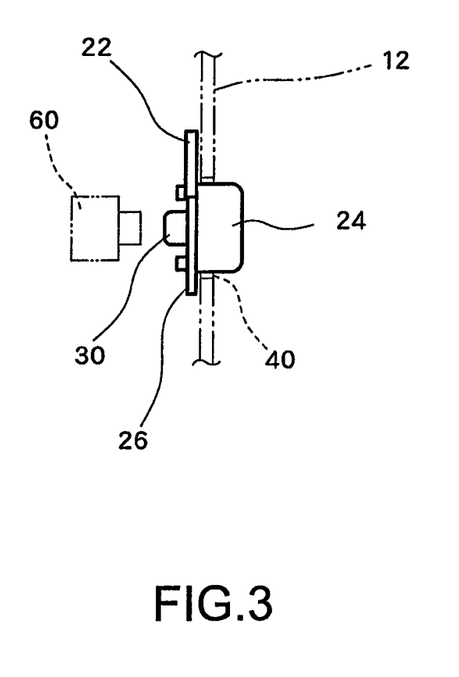
FIG. 3 is a side view of the actuation button.

FIG. 2 is a rear view of the actuation button 14 used in the embodiment, and FIG. 3 is a side view of the actuation button 14. The actuation button 14 is a component that becomes exposed in part from an exterior surface of an electronic device to accept user's operation (press action). The actuation button is made of a material possessing superior moldability and appropriate elasticity, like a resin, an elastomer, and silicon. The actuation button 14 is roughly divided into a button portion 20 that actually accepts user's operation and arms 22 joined to the button portion 20.

The button portion 20 is also roughly divided into a main body 24 and a base 26. The main body 24 is a region that actually receives user's press action. The main body 24 assumes a horizontally long, substantially oblong shape when viewed from the front and is sufficiently greater than the design panel 12 in terms of a thickness. The main body 24 is inserted from the back side of the design panel 12 into an insert hole 40 opened in the design panel 12 during assembly of the actuation button 14, to thus protrude outside from a front surface of the design panel 12.

A base end of the button portion 20 is joined to the base 26. The base 26 is a substantially rectangular plate-shaped region that is larger than at least the insert hole 40 and the button portion 20. A positioning hole 28 is opened in a neighborhood of an upper end of the base 26. The positioning hole 28 is a hole into which a positioning boss 42 formed on the back surface of the design panel 12 is to be inserted. The position of the button portion 20 with respect to the design panel 12 and, by extension, the position of the main body 24 of the button portion with respect to the insert hole 40 are determined as a result of the positioning boss 42 being inserted into the positioning hole 28.

A contact boss 30 is projectingly formed on a back surface of the base 26. The contact boss 30 comes into contact with a press button switch 60 placed on a back of the actuation button 14 in synchronism with pressing of the main body 24 performed by the user, thereby pressing the press button switch 60.

A pair of arms 22 extend from both lateral sides of the upper end of the base 26. The arms 22 are regions that are substantially strip-shaped and elongated in a longitudinal direction of the button portion 20. A leading end of each of the arms 22 is slightly thicker and wider. A slit 32 elongated in the longitudinal direction of the button portion 20 is formed in the wide portion. During assembly of the actuation button 14, projecting members 44 projectingly provided on the back surface of the design panel 12 are inserted into the corresponding slits 32. A width of each of the slits 32 measured along its minor axis is greater than a width of a root portion of each of the projecting members 44 but smaller than a width of a turned edge 46 equivalent to a leading end of the projecting member 44. An outer edge of the slit 32 is elastically deformed by exertion of force, whereby the width of each of the slits 32 minutely changes, as appropriate. By virtue of elastic deformation, the wide turned edge 46 of the projecting member 44 can pass through the slit 32.

A passage hole 34 that is wider than the slit 32 is connected to a leading end of each of the slits 32. The passage holes 34 are wider than the corresponding turned edges 46 on the respective projecting members 44 and utilized when the arm 22 is detached from the projecting member 44.

Figure 4:
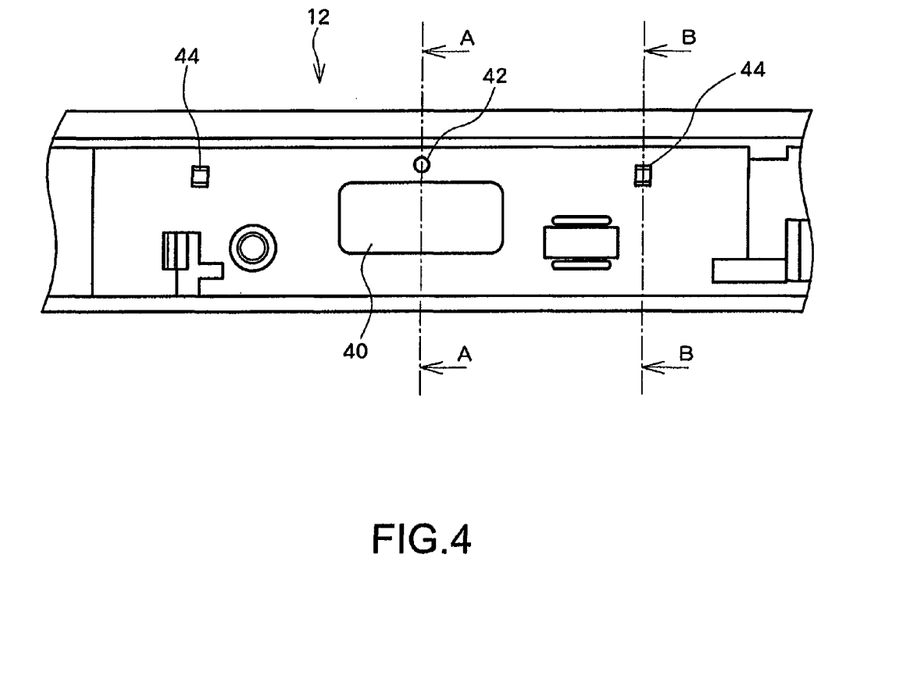
FIG. 4 is a rear view of a design panel.
Figure 5:
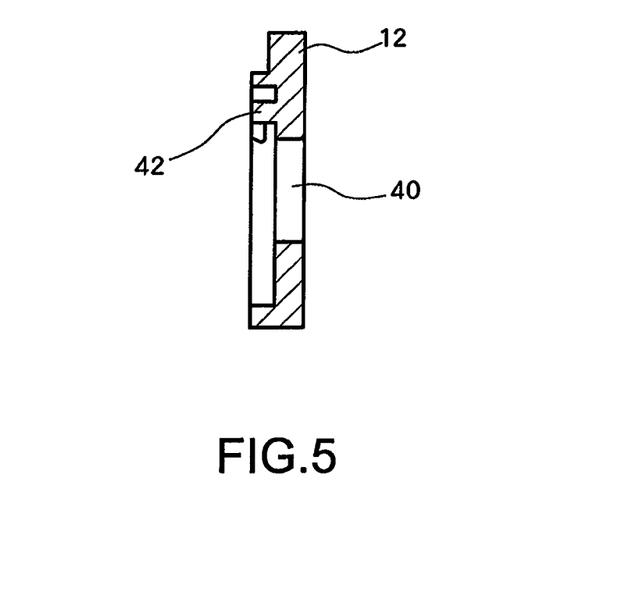
FIG. 5 is a cross sectional view taken along line A-A shown in FIG. 4.
Figure 6:
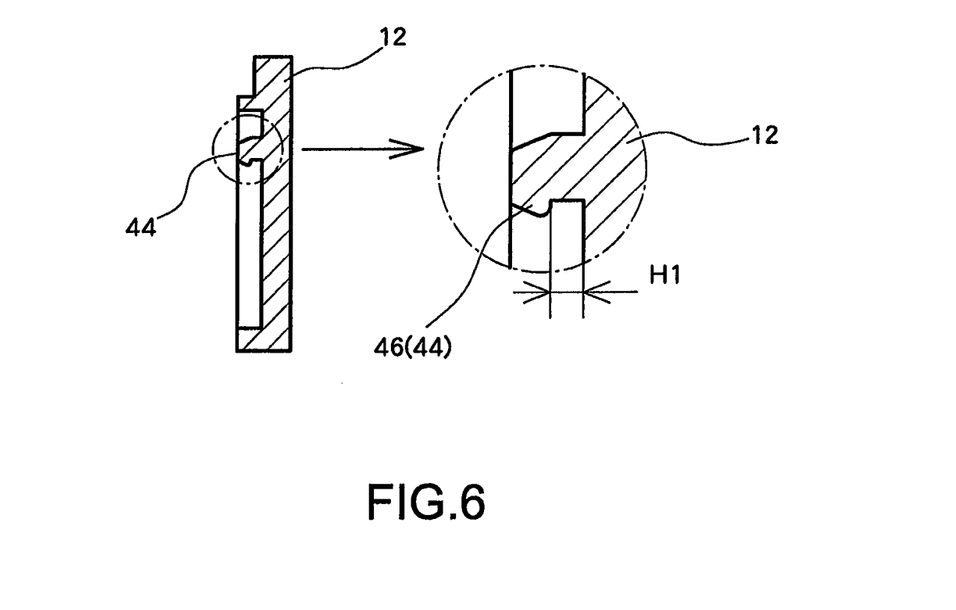
FIG. 6 is a cross sectional view taken along line B-B shown in FIG. 4.

The design panel 12 is now described by reference to FIGS. 4 through 6. FIG. 4 is a rear view of the design panel 12; FIG. 5 is a cross sectional view taken along line A-A shown in FIG. 4; and FIG. 6 is a cross sectional view taken along line B-B shown in FIG. 4. The design panel 12 is a panel that is attached to the front of the electronic device, like the optical disc drive 10, and that is made of a resin, and the like. The insert hole 40 into which the main body 24 of the button portion 20 is to be inserted is formed at a substantial center of the design panel 12. The insert hole 40 assumes a horizontally long, substantially oblong shape when viewed from the front and is slightly larger than the main body 24 of the button portion 20. The positioning boss 42 is projectingly formed at a position above the insert hole 40 on the back surface of the design panel 12. The positioning boss 42 is a region that is to be inserted into the positioning hole 28 of the actuation button 14 and that is slightly smaller than the positioning hole 28 in terms of a diameter. The position of the main body 24 of the button portion with respect to the insert hole 40 is determined by insertion of the positioning boss 42 into the positioning hole 28.

The projecting members 44 are formed at right and left positions with the positioning boss 42 interposed therebetween. The projecting members 44 are pillars projecting from the back surface of the design panel 12 and act as engagement members that are engaged with portions of the respective arms. The projecting members 44 are provided at positions corresponding to the respective slits 32 of the arms 22 in a state in which the main body 24 of the actuation button 14 is inserted into the insert hole 40 and in which the arms 22 are stretched straight. The turned edge 46 assuming a substantially triangular cross sectional profile is provided at the leading end of the individual projecting member 44. The turned edge 46 is a region intended for preventing detachment of the corresponding arm 22 inserted into the projecting member 44. The maximum width of the turned edge 46 is greater than the width of the slit 32 formed in the arm 22. An upper surface of the individual turned edge 46 is tapered so as to become wider with a nearer approach to the root. A distance H1 from a bottom surface of the turned edge 46 to the back surface of the design panel 12 is slightly larger than a thickness of the leading end of the individual arm 22 to thereby prevent the arm 22 into which the corresponding projecting member 44 from flip-flopping in the projecting direction of the projecting member 44.

Flow for attaching the actuation button 14 having the foregoing configuration to the design panel 12 is now described by reference to FIGS. 7A, 7B, 7C, and 7D. FIGS. 7A, 7B, 7C, and 7D are drawings showing flow for attaching the actuation button 14 to the design panel 12.

Figure 7A:
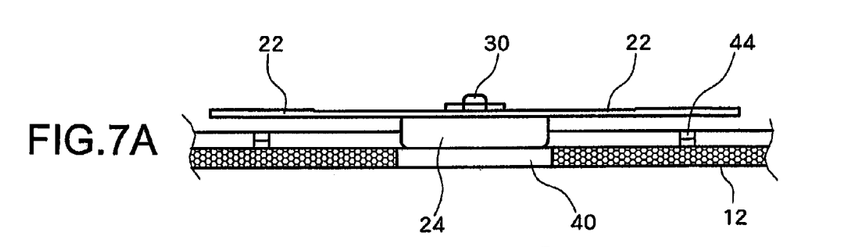
FIG. 7A is a drawing showing a flow for attaching the actuation button to the design panel.
Figure 7B:
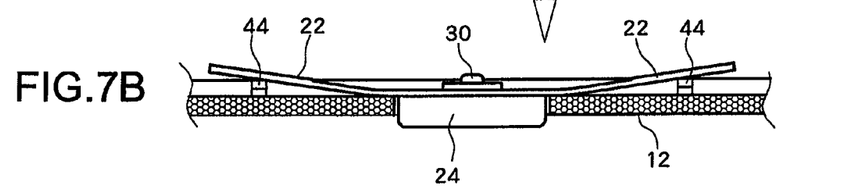
FIG. 7B is a drawing showing a flow for attaching the actuation button to the design panel.

When the actuation button 14 is attached to the design panel 12, the main body 24 of the button portion 20 is inserted into the insert hole 40 from the back side of the design panel 12 (see FIG. 7A). The position of the main body 24 is finely adjusted at this time such that the positioning boss 42 is inserted into the positioning hole 28. The main body 24 is pushed into the insert hole 40 until the base 26 comes into contact with the back surface of the design panel 12, with the positioning boss 42 inserted into the positioning hole 28 (see FIG. 7B). The slits 32 formed in the respective arms 22 are placed on the respective projecting members 44 provided on the design panel 12.

Figure 7C:
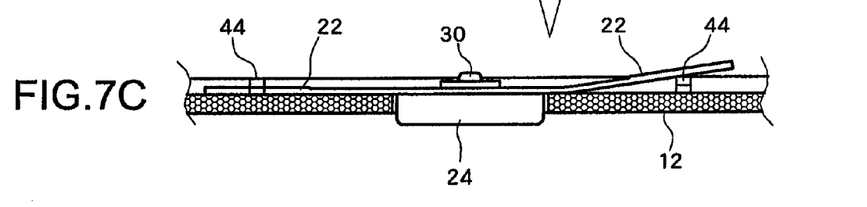
FIG. 7C is a drawing showing a flow for attaching the actuation button to the design panel.
Figure 7D:
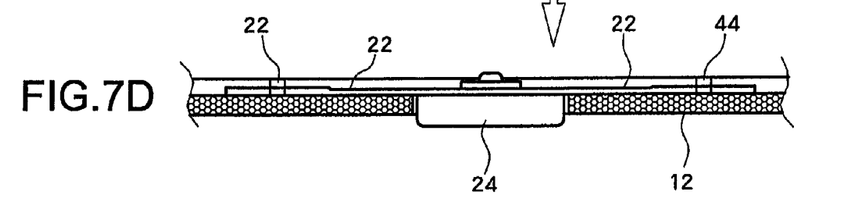
FIG. 7D is a drawing showing a flow for attaching an actuation button to the design panel.

In this state, the leading ends of the arms 22 are subsequently pushed toward the roots of the respective projecting members 44, thereby elastically deforming the outer edges of the respective slits 32 and letting the projecting members 44 pass through the respective slits 32 (see FIG. 7C and FIG. 7D). When the force is released after insertion of the projecting members 44, the outer edges of the respective slits 32 are elastically restored, to thus again become narrower than the turned edges 46. As a consequence, the leading ends of the respective arms 22 and the projecting members 44 are not disengaged from each other unless special force is exerted on the arms, so that the arms 22 are attached to the design panel 12. Specifically, in the present embodiment, the actuation button 14 can be readily attached to the design panel 12 without use of welding or tools, like screws. In the meantime, detachment of the actuation button 14 is reliably prevented by means of engagement of the leading ends of the arms 22 with the corresponding projecting members 44.

Further, as mentioned previously, the slits 32 are wider than the roots of the respective projecting members 44 in the present embodiment. Therefore, the leading end of the actuation button 14 can be slid along its longitudinal direction with the actuation button 14 attached to the design panel 12 (the state shown in FIG. 7D). Put another way, in the present embodiment, the arms 22 can be said to be allowed to move along their longitudinal direction (i.e., a plane direction of the design panel) when assembly of the actuation button 14 is completed. Operation feeling of the actuation button 14 can thereby be enhanced, and durability of the actuation button 14 can also be enhanced. Explanations are given to this point in comparison with the related art techniques.

According to many of the related art techniques, the leading ends of the arms 22 are fastened to portions of the design panel 12 in a positionally fixed manner, thereby attaching the actuation button 14 to the design panel 12. Specifically, according to the related art techniques, the leading ends of the arms 22 are fastened to the back surface of the design panel 12 by use of fastening means, like screw engagement and welding. Alternatively, bosses projecting from the back surface of the design panel 12 are inserted into round holes formed in the leading ends of the respective arms 22, whereby the actuation button 14 is attached to the design panel 12. According to the techniques, the positions of the leading ends of the arms 22 become stationary, and the arms 22 cannot move in the plan direction of the design panel 12.

The following problems arise in such a case. The main body 24 of the button portion of the assembled actuation button 14 usually undergoes press action, as appropriate. In synchronism with press action, the main body 24 of the button portion advances or recedes along a direction perpendicular to the surface of the design panel 12. In order to cause the main body 24 of the button portion to advance or recede as mentioned above, the base 26 joined to the main body 24 of the button portion and the arms 22 must also be movable to a certain extent. However, under the prior art technique for fastening the leading ends of the respective arms 22 to the design panel 12 in a positionally fixed manner, the arms 22 cannot move as a whole. Therefore, only the positions of base ends of the arms 22 (portions of the arms connected to the base 26) become movable when the arms 22 are deflected in association with actuation of the main body 24 of the button portion. However, a load is imposed on the arms 22 by deflection of the arms 22, which raises a problem of deterioration of durability of the arms 22. Further, resisting force of the arms 22 against deflection is transmitted to the user as resisting feeling to operation for pressing the main body 24 of the button portion, which in turn raises a problem of deterioration of operation feeling of the button.

Further, in the present embodiment, the arms 22 are movable along their longitudinal direction as mentioned above. For this reason, when the main body 24 of the button portion is pressed, the arms 22 can move as a whole in association with actuation of the main body 24 of the button portion. As a result of the arms 22 being actuated as a whole, an amount of deflection occurring in the arms 22 and, by extension, load exerted on the arms 22 can be lessened, as a result of which durability of the actuation button 14 can be enhanced. Since the main body 24 of the button portion can be pressed without involvement of great deflection of the arms 22, resisting feeling incidental to the press action can be lessened. The user can be provided with a feeling of the ability to deeply press the main body 24 of the button portion by a light touch. As a consequence, operation feeling of the button can be enhanced.

Moreover, in the present embodiment, the actuation button 14 can be readily detached even after the actuation button 14 has been attached to the design panel 12. Specifically, in the present embodiment, the passage hole 34 that is wider than the maximum width of the projecting member 44 is joined to the leading end of the individual slit 32 into which the corresponding projecting member 44 is inserted. With such a configuration, when the arms 22 are desired to be disengaged from the projecting members 44, the main body 24 of the button portion is first pushed, and the leading ends of the arms 22 are slid along the slits 32 while the positioning hole 28 is released from the positioning boss 42. The entirety of the actuation button 14 is thereby slid, to thus place one of the projecting members 44 in the passage hole 34 of one arm 22. When the leading end of the arm 22 is raised in a direction departing from the projecting member 44 in this state, the leading end of the arm 22 comes off from the corresponding projecting member 44, whereby the projecting member 44 and the leading end of the arm 22 are disengaged from each other. The other arm 22 is also disengaged along similar procedures. In a series of operations, heavy load is exerted on neither the actuation button 14 nor the design panel 12. For this reason, the actuation button 14 can be detached from the design panel 12 without inflicting damage to the actuation button 14 or the design panel 12.

As mentioned above, the actuation button 14 is designed so as to be easily detached from the design panel 12, whereby wasteful discarding of a component can be lessened. Specifically, if a defect (e.g., a flaw) has occurred in only the actuation button 14 when the actuation button 14 is attached to the design panel 12 by means of fixing means, like welding, there will be no alternative way but to discard the actuation button 14. In this case, since the actuation button 14 cannot be detached from the design panel 12, the design panel 12 having no flaws also must be discarded along with the actuation button 14. Conversely, even if a flaw has occurred in only the design panel 12, the actuation button 14 having no flaw must also be discarded. Specifically, when the actuation button 14 is attached to the design panel 12 by undetachable fastening means, like welding, and if either the actuation button 14 or the design panel 12 has become defective, a non-defective one must also be discarded, which can be said to be useless.

By contrast, in the present embodiment, the actuation button 14 can be detached from the design panel 12 without inflicting damage to either the actuation button 14 or the design panel 12. Therefore, when a defect has occurred in either the actuation button 14 or the design panel 12, only the nondefective one is left and used with another product. Consequently, wasteful discarding of a component can be lessened, and manufacturing costs can be curtailed further.

A second embodiment of the invention is now described by reference to the drawings. In the second embodiment, portions of the arms 22 are inserted into spacing between bridge members 48 formed so as to project from the back surface of the design panel 12 and the back surface of the design panel 12, thereby attaching the actuation button 14 to the design panel 12. Detailed descriptions are hereunder provided to this point.

Figure 8:
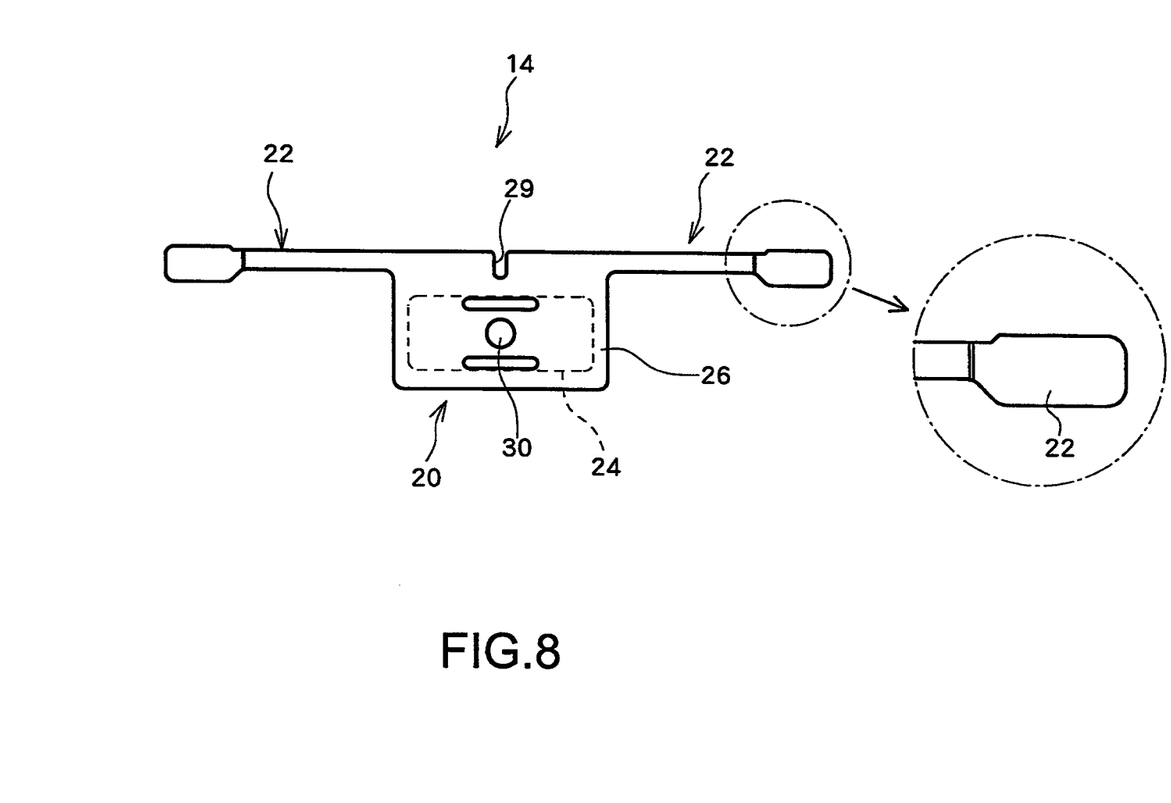
FIG. 8 is a rear view of the actuation button.
Figure 9:
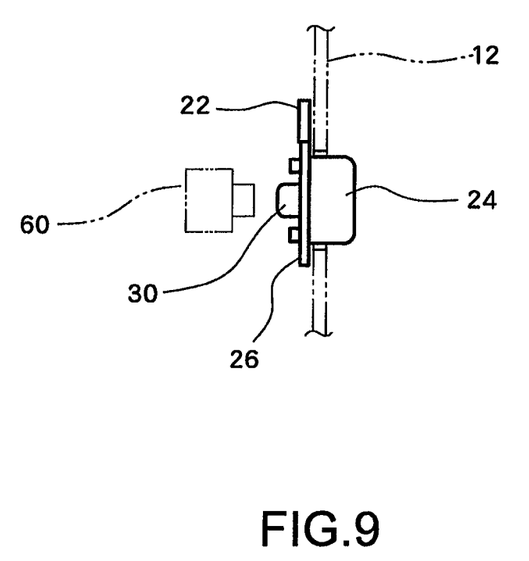
FIG. 9 is a side view of the actuation button.

FIG. 8 is a rear view of the actuation button 14 used in the second embodiment. FIG. 9 is a side view of the actuation button 14. The actuation button 14 is roughly divided into the button portion 20 and the arms 22 as in the first embodiment. The button portion 20 includes the substantially-block-shaped main body 24 that actually accepts operation, the flat-plate-shaped base 26 joined to a base end of the main body 24, and the contact boss 30 that protrudes from the back surface of the base 26. A substantially circular-arc positioning notch 29 is formed in a substantial center of an upper end of the base 26. The positioning boss 42 projectingly formed on the back surface of the design panel 12 is positioned in the positioning notch 29, whereby a relative position of the main body 24 of the button portion is determined with respect to the insert hole 40.

The pair of arms 22 extend from both sides of the base 26. The arms 22 are strip-shaped members that are elongated along the longitudinal direction of the main body 24 of the button portion. Each of the leading ends of the arms 22 is widely broadened and slightly thicker. The width of the leading end of the individual arm 22 is smaller than a width of the corresponding bridge member 48 to be described later, and the thickness of the leading end is slightly smaller than a space between the bridge member 48 and the back surface of the design panel 12.

Figure 10:
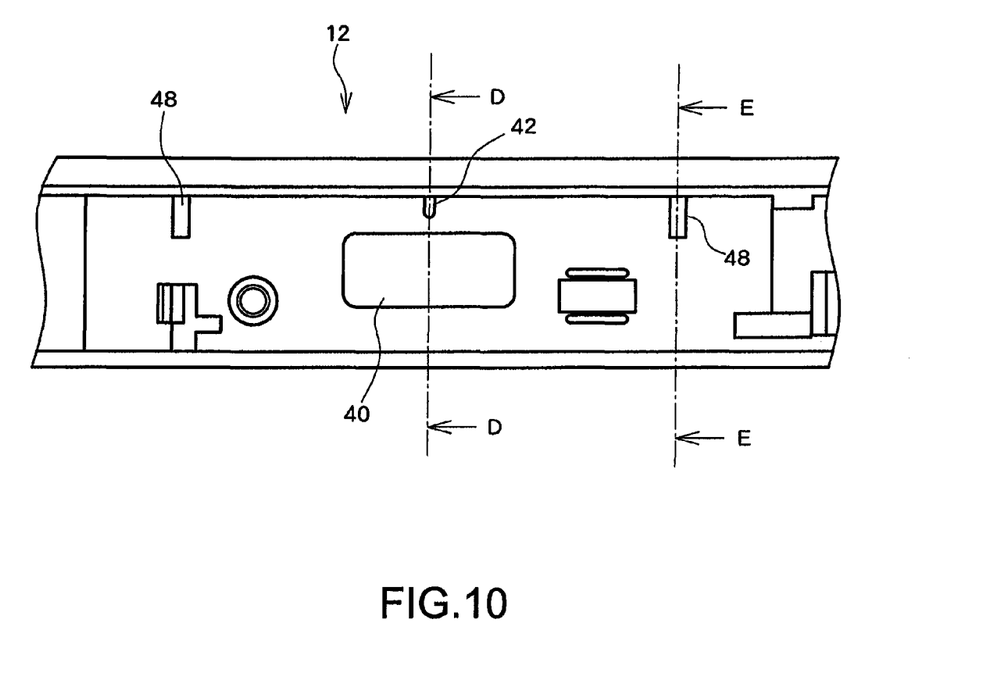
FIG. 10 is a rear view of the design panel.
Figure 11:
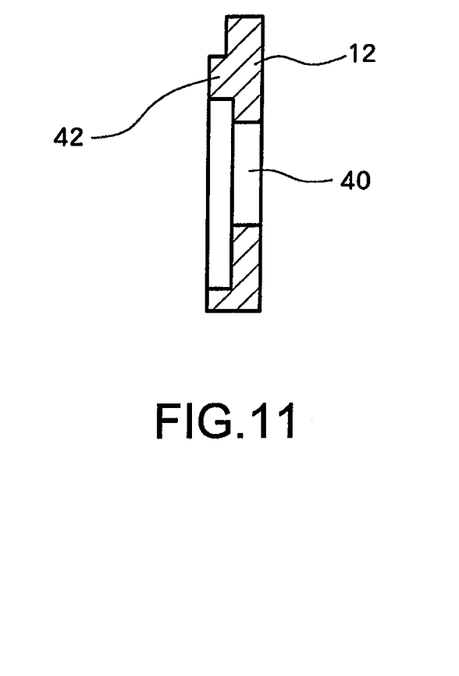
FIG. 11 is a cross sectional view taken along line D-D shown in FIG. 10.
Figure 12:
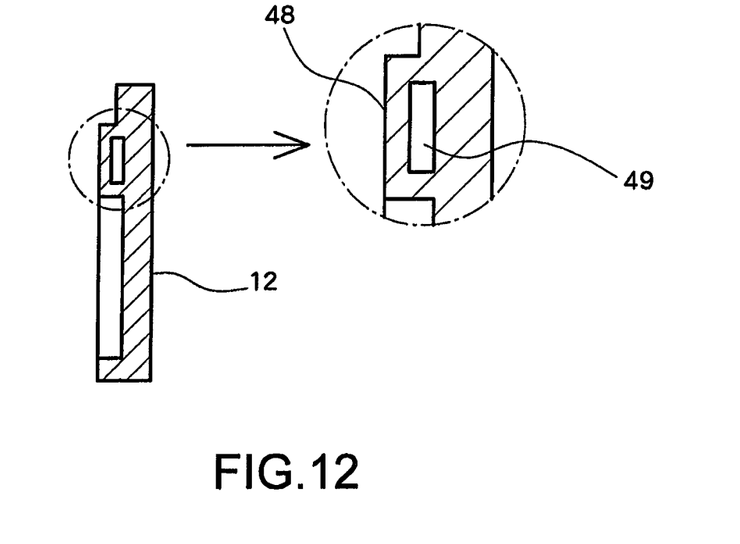
FIG. 12 is a cross sectional view taken along line E-E shown in FIG. 10.

The design panel 12 employed in the second embodiment is now described by reference to FIGS. 10 and 11. FIG. 10 is a rear view of the design panel 12; FIG. 11 is a cross sectional view taken along line D-D shown in FIG. 10; and FIG. 12 is a cross sectional view taken along line E-E shown in FIG. 10.

The insert hole 40 into which the main body 24 of the button portion is to be inserted is formed substantially in the center of the design panel 12 as in the first embodiment. The positioning boss 42 to be inserted into the positioning notch 29 is formed at a position above the insert hole 40 on the back surface of the design panel 12.

The bridge members 48 are formed on right and left sides of the positioning boss 42. The bridge members 48 act as engagement members that are engaged with portions of the respective arms. Each of the bridge members 48 is a region that stands on the back surface of the design panel 12 and that assumes a substantially C-shaped cross sectional profile. A substantially rectangular space 49 is formed between the bridge member 48 and the back surface. The thickness of the space 49 is slightly larger than the thickness of the leading end of the arm 22, and the width of the space 49 is slightly larger than the width of the leading end of the arm 22. The bridge members 48 are placed at positions where the leading ends (the wider and thicker portions) of the respective arms 22 are situated when the main body 24 of the button portion is inserted into the insert hole 40.

Flow for attaching the actuation button 14 to the design panel 12 is now described by reference to FIGS. 13A, 13B, 13C, 13D, and 13E. FIGS. 13A, 13B, 13C, 13D, and 13E are drawings showing a flow for attaching the actuation button 14 to the design panel 12.

Figure 13A:
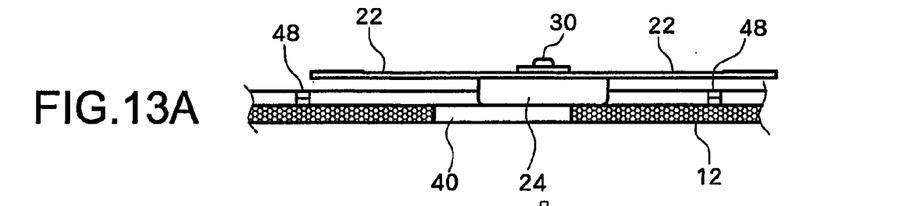
FIG. 13A is a drawing showing a flow for attaching the actuation button to the design panel.
Figure 13B:
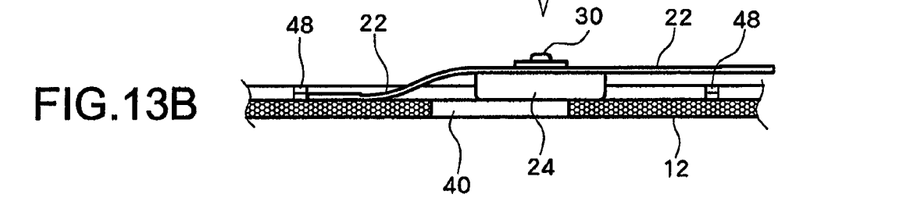
FIG. 13B is a drawing showing a flow for attaching the actuation button to the design panel.
Figure 13C:
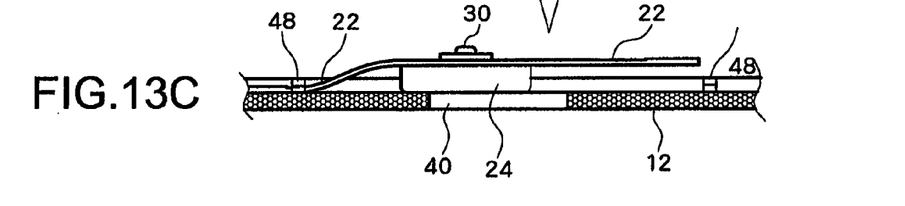
FIG. 13C is a drawing showing a flow for attaching the actuation button to the design panel.
Figures 13D, 13E:
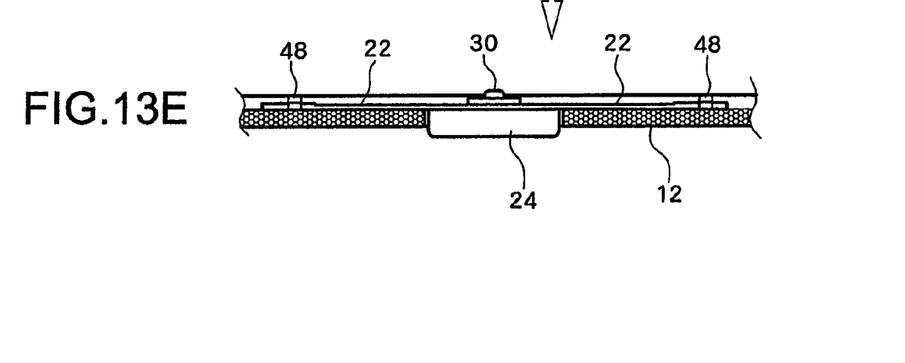
FIG. 13D is a drawing showing a flow for attaching the actuation button to the design panel.
FIG. 13E is a drawing showing a flow for attaching the actuation button to the design panel.

When the actuation button 14 is attached to the design panel 12, the actuation button 14 is brought into contact with the back surface of the design panel 12 while the main body 24 of the button portion remains displaced from the insert hole 40 (see FIG. 13A). The positions are adjusted in this state, and the leading end of one arm 22 is inserted into a space between the corresponding bridge member 48 and the back surface of the design panel 12 (see FIG. 13B). The entirety of the actuation button 14 is slid, as it is, along the longitudinal direction of the arm 22. Further, the leading end of the remaining arm 22 is inserted into a space between the corresponding bridge member 48 and the back surface of the design panel 12 (see FIGS. 13C and 13D). When the two arms 22 are engaged with the corresponding bridge members 48 as mentioned above, the main body 24 of the button portion is inserted into the insert hole 40 (see FIG. 13E). The position of the main body 24 of the button portion is finely adjusted such that the positioning boss 42 provided on the design panel 12 is situated in the positioning notch 29 provided on the actuation button 14. Finally, the main body 24 of the button portion can be inserted to a position where a front surface of the base 26 comes into contact with the back surface of the design panel 12, assembly operation ends.

As is obvious from the descriptions provided above, the actuation button 14 can be readily attached to the design panel 12 without use of welding or tools, like screws, even in the present embodiment in the same manner as in the first embodiment. Detachment of the actuation button 14, however, is prevented reliably by means of engagement of the leading ends of the arms 22 with the corresponding bridge members 48.

Even in the present embodiment, movements of the arms 22 in their longitudinal direction are allowed when assembly of the actuation button 14 is completed. As a consequence, operation feeling of the actuation button 14 can be enhanced, and durability of the actuation button 14 can also be enhanced.

Further, even in the present embodiment, the once-assembled actuation button 14 can be readily detached from the design panel 12. Specifically, when the once-assembled actuation button 14 is desired to be detached from the design panel 12, the essential requirement is to perform in reverse order the flow of assembly operation shown in FIG. 13, to thus make the two arms 22 deflected and remove the leading ends of the arms from the corresponding bridge members 48. The arms 22 are thereby disengaged from the bridge members 48. Hence, the actuation button 14 can be detached, so long as the main body 24 of the button portion inserted into the insert hole 40 is pushed out of the insert hole 40. As a result of the actuation button being made detachable, wasteful discarding of a component is lessened, and manufacturing costs can be curtailed.

Figure 14:
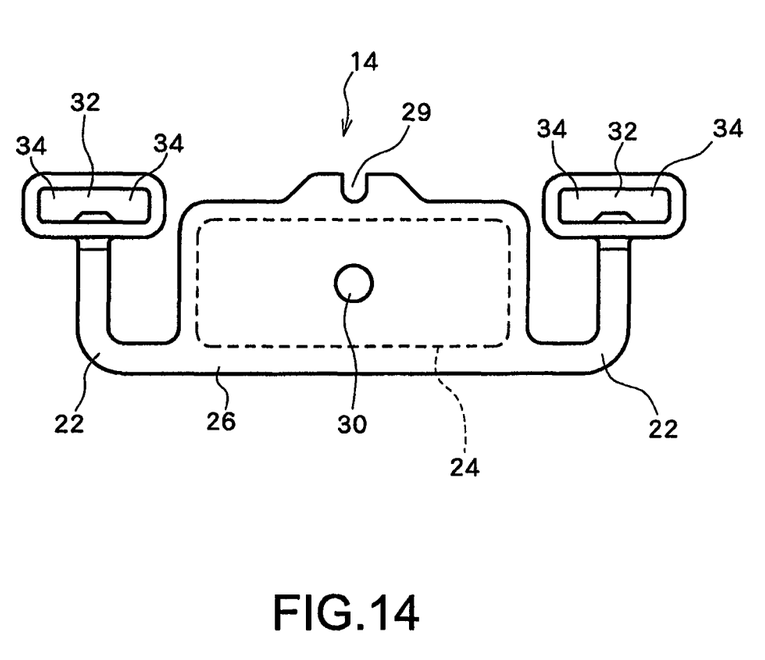
FIG. 14 is a rear view of the actuation button.

The present invention has been described thus far by means of taking the two embodiments as examples. Shapes and positions of the respective regions may also be changed, as appropriate, so long as the portions of the arms 22 are engaged with engagement members provided on the back surface of the design panel 12 while remaining movable in a plane direction of the design panel 12. For instance, both of the arms 22 are described as linearly-extended strip-shaped regions in the embodiments. However, each of the arms 22 can also assume a bent at an arbitrary position. Specifically, as shown in FIG. 14, each of the arms 22 can assume a substantially-L-shaped geometry that extends from either side on a lower end of the base 26 and is bent at an arbitrary point upwardly at an angle of about 90°. The slit 32 to engage with the corresponding projecting member 44 projecting from the back surface of the design panel 12 or an insert portion to be inserted into the corresponding bridge member 48 provided on the back surface of the design panel 12 may also be formed at the leading end of each of the substantially-L-shaped arms 22. The arms 22 are bent in part as mentioned above, whereby the entire actuation button 14 can be reduced in size. Although the descriptions have been provided above by reference to the optical disc drive 10, the present invention can naturally be applied to another electronic device, so long as the electronic device has the design panel 12 to which the actuation button 14 is attached.

The invention claimed is:

1. An electronic device comprising a design panel; and
an actuation button that is attached to the design panel and that has a button portion to accept a user's operation and arms connected to the button portion, wherein
the design panel includes
an insert hole into which the button portion is inserted;
engagement members that are engaged with portions of the respective arms on a back surface of the design panel in a state of the arms being allowed to move in a plane direction of the design panel, thereby preventing drop of the arms from the design panel,
wherein each of the arms has a slit extending in a longitudinal direction of the arm; and
wherein the engagement members are projecting members that project from a back surface of the design panel, each of the plurality of projection members is inserted into a corresponding slit, and each of the projecting members has at a leading end thereof a turned portion having a width which is larger than a width of the corresponding slit.

2. The electronic device according to claim 1, wherein each of the arms further includes a passage hole that is connected to one of the slits and that has a width larger than a width of a corresponding turned portion.

3. The electronic device according to claim 1, wherein the plane direction of the design panel is a longitudinal direction of the arms.

4. The electronic device according to claim 1, wherein the design panel is made of a resin.

5. An electronic device comprising:
a design panel; and
an actuation button that is attached to the design panel and that has a button portion to accept a user's operation and arms connected to the button portion, wherein
the design panel includes
an insert hole into which the button is inserted; and
engagement members that are engaged with portions of the respective arms on a back face of the design panel in a state of the arms being allowed to move in a plane direction of the design panel, thereby preventing drop of the arms from the design panel,
wherein the engagement members are bridge members that protrude from a back surface of the design panel, and a space is made between each of the bridge members and the back surface; and
wherein each of the arms is slid and inserted into a corresponding space, to engage with a corresponding bridge member.

* * * * *